United States Patent
Kapadi et al.

(10) Patent No.: US 7,321,806 B2
(45) Date of Patent: Jan. 22, 2008

(54) COMBINED TRIMMING AND SKIVING OF STOCK

(75) Inventors: Mangesh D. Kapadi, Bangalore (IN);
Lingathurai Palanisamy, Bangalore (IN); Pragathieswaran Shanmugavelu, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 13 days.

(21) Appl. No.: 11/356,710

(22) Filed: Feb. 17, 2006

(65) Prior Publication Data

US 2007/0208450 A1 Sep. 6, 2007

(51) Int. Cl.
*G06F 7/66* (2006.01)

(52) U.S. Cl. .................. 700/127; 700/171; 83/401; 29/2.1; 162/120

(58) Field of Classification Search .............. 83/824, 83/869, 401; 29/2.1; 162/120; 700/127, 700/194; 705/28
See application file for complete search history.

(56) References Cited

U.S. PATENT DOCUMENTS

| | | | | |
|---|---|---|---|---|
| 5,815,398 | A * | 9/1998 | Dighe et al. | 700/217 |
| 2004/0019401 | A1 * | 1/2004 | Bush et al. | 700/127 |
| 2004/0102867 | A1 * | 5/2004 | Palanisamy et al. | 700/171 |
| 2006/0243849 | A1 * | 11/2006 | Kojo | 242/525 |

OTHER PUBLICATIONS

M. P. Johnson et al., "Skiving Addition to the Cutting Stock Problem in the Paper Industry", © 1997 Society for Industrial and Applied Mathematics, vol. 29, No. 3, pp. 472-483.
E. J. Zak, "Row and column generation technique for a multistage cutting stock problem", Computers & Operations Research 29 (2002) pp. 1143-1156.
G. Scheithauer et al., "The modified integer round-up property of the one-dimensional cutting stock problem", European Journal of Operational Research 84 (1995) pp. 562-571.
F. Vanderbeck, "A Nested Decomposition Approach to a Three-Stage, Two-Dimensional Cutting-Stock Problem", Management Science © 2001 INFORMS vol. 47, No. 6, Jun. 2001 pp. 864-879.
R. Klempous et al., "Interactive procedures in large-scale two-dimensional cutting stock problems", Journal of Computational and Applied Mathematics 66 (1996) pp. 323-331.

(Continued)

*Primary Examiner*—Leo Picard
*Assistant Examiner*—Sheela Rao
(74) *Attorney, Agent, or Firm*—Schiff Hardin LLP

(57) ABSTRACT

Cutting and skiving patterns to be used in the production of product rolls from a master roll are selected so as to optimize trim efficiency. The product rolls have widths ordered by customers. In selecting these cutting and skiving patterns, cutting patterns that can be used to trim master rolls of the same or different dimensions in order to fill customer orders for the product rolls are generated, skiving patterns for skiving auxiliary rolls that result from trimming the master roll in order to produce the product rolls according to the customer orders are generated, and those of the generated skiving and cutting patterns that optimize trim efficiency for the production of the product rolls are selected.

35 Claims, 5 Drawing Sheets

OTHER PUBLICATIONS

P. E. Sweeney et al., "One-dimensional cutting stock decisions for rolls with multiple quality grades", European Journal of Operational Research 44 (1990), pp. 224-231.

M. Hifi et al., "An Exact Algorithm for Constrained Two-Dimensional Two-Staged Cutting Problems", Operations Research vol. 53, No. 1 Jan.-Feb. 2005, pp. 140-150.

H. H. Yanasse et al., "Two-dimensional Cutting Stock with Multiple Stock Sizes", Journal of the Operational Research Society, 42 pp. 673-683.

E.J. Zak, "The skiving stock problem as a counterpart of the cutting stock problem", Intl. Transactions in Operational Research 10, (2003) pp. 637-650.

* cited by examiner

COMBINED TRIMMING AND SKIVING OF STOCK

TECHNICAL FIELD OF THE INVENTION

The present invention is directed to a process of joining two or more narrow rolls of stock, such as paper, to form a wider roll as determined by customer demand. This process is referred to as skiving and may be combined with traditional roll-cutting technology to provide a total solution to meet customer demands for ordered product rolls.

BACKGROUND OF THE INVENTION

Master rolls are trimmed (i.e., cut) to produce multiple product and/or standard rolls. Product rolls are produced to fill customer orders. Standard rolls have widths and diameters that are frequently requested by customers and that are produced on speculation that customers will order rolls in those widths and diameters.

The orders for product rolls from different customers have different specifications. Thus, it is desirable to form cutting patterns that minimize cutting losses while at the same time meeting the specifications of each customer. When the ordered widths exceed half of the width of the master roll from which the product rolls are cut, trim efficiency, even trim efficiency obtained from algorithms that optimize trim efficiency, can be very low. For example, if all of the sizes ordered by customers exceed half the width of the master rolls, the trim loss obtained by using trimming algorithms is poor and, in worst case, can approach 49%.

This waste can be reduced by creating auxiliary (i.e., intermediate) rolls from the excess width trimmed off of the master rolls and then by edge-wise joining the material of these auxiliary rolls to form wider rolls to meet the ordered widths. This process of combining rolls of smaller widths to form rolls of larger widths is termed "skiving." Thus, skiving is used to join two or more auxiliary rolls to produce a skived roll.

Customer demand for product rolls, then, can be filled from the master roll directly and also from the skived rolls that are created by skiving.

When several auxiliary rolls are available, the objective of skiving should be to minimize the overall trim loss. Hence, skiving and trimming can be viewed as counter parts of the optimization problem, and can be analyzed and modeled in a combined optimization system to minimize trim loss by generating auxiliary rolls which will be later joined to produce ordered (and/or standard) width rolls. This optimization system may be based on a mathematical model that solves the skiving and trimming problems jointly to improve trim efficiency.

The present invention is directed to a system and/or method that solves one or more of the above stated or other problems and/or that combines skiving and trimming solutions in order to increase trimming efficiency.

SUMMARY OF THE INVENTION

According to one aspect of the present invention, a method is provided to select cutting and skiving patterns to be used in the production of product rolls from at least one master roll. The product rolls have widths ordered by customers. The method is implemented by a processing system and comprises the following: selecting those of the ordered widths that are suitable for skiving, wherein the selection of ordered widths is based on a first constraint; selecting auxiliary widths based on the selected ordered widths and on a width of the master roll, wherein the selecting of auxiliary widths is further based on a second constraint; generating skiving patterns that can be used to join the selected auxiliary widths to form the skived rolls, wherein the generation of the skiving patterns is based on a third constraint; generating cutting patterns that can be used to trim the master roll to form the product rolls and to form auxiliary rolls based on the auxiliary widths, wherein the generation of the cutting patterns is based on a fourth constraint; and, selecting those of the generated skiving and cutting patterns that optimize trim efficiency.

According to another aspect of the present invention, a method comprises five distinct steps for selecting cutting and skiving patterns to be used in the production of product rolls having widths ordered by customers. The method is implemented by a processing system and comprises the following: selecting those of the ordered widths as candidates for skiving; selecting auxiliary widths based on the selected ordered widths; generating skiving patterns that can be used to join the selected auxiliary widths to form skived rolls; generating cutting patterns that can be used to trim at least one master roll to form the product rolls; and, selecting those of the generated skiving and cutting patterns that minimize the number of master rolls used to produce product rolls.

According to still another aspect of the present invention, a computer readable storage medium has program code stored thereon which, when executed, performs the following functions: constraint based generation of cutting patterns that can be used to trim a master roll in order to fill customer orders for product rolls; constraint based generation of skiving patterns for skiving auxiliary rolls that result from trimming the master roll in order to produce the product rolls according to the customer orders; and, integer linear programming selection of those of the generated skiving and cutting patterns that optimize trim efficiency for the production of the product rolls.

BRIEF DESCRIPTION OF THE DRAWINGS

These and other features and advantages of the present invention will become better understood when the following detailed description is read with reference to the accompanying drawings in which.

DETAILED DESCRIPTION

Figure 1:
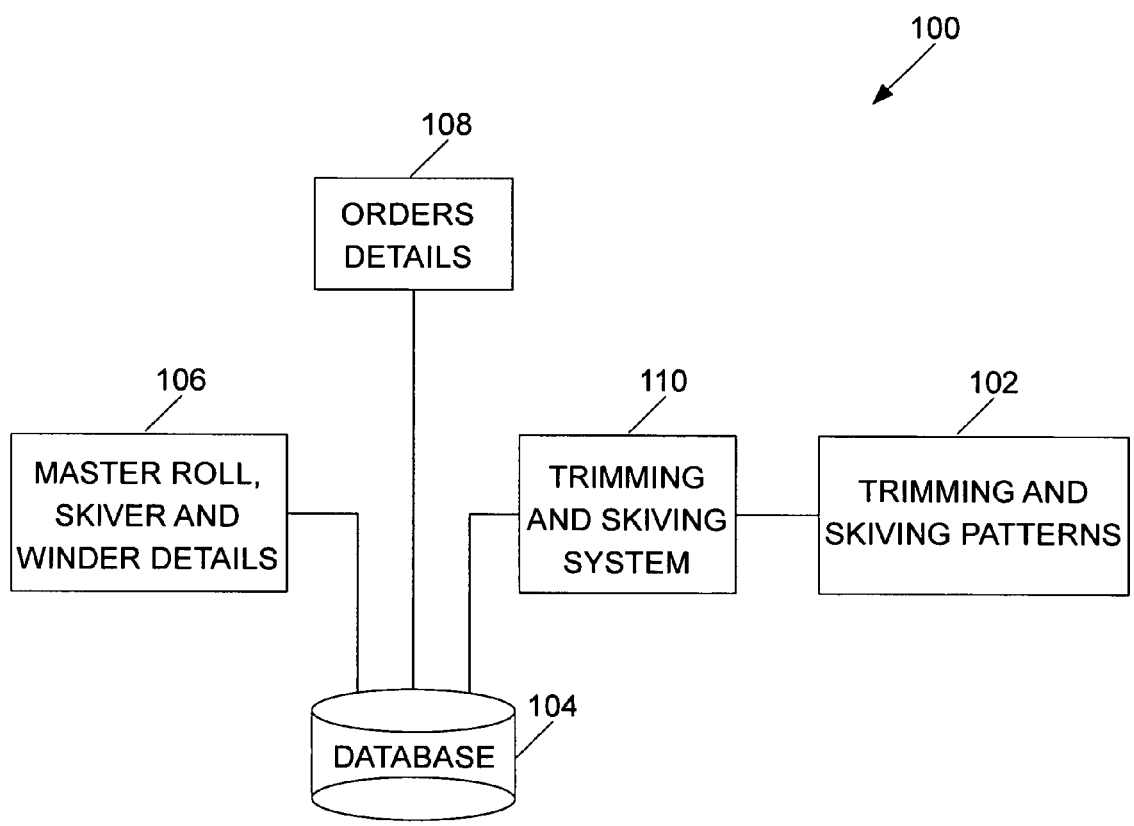
FIG. 1 illustrates a trimming and skiving optimization system that is useful in implementing an optimization model according to an embodiment of the present invention.

In one embodiment of the present invention, the trimming and skiving optimization system may be decomposed into five steps, although any number of steps can be used according to other embodiments of the present invention. When decomposed into five steps, these five steps may be, for example, (1) selecting ordered widths from among the widths specified by the customers in their orders such that the ordered widths are candidates for skiving, (2) selecting auxiliary widths (which will be skived in order to fill customer orders), (3) generating skiving patterns based on the selected ordered and auxiliary widths, (4) generating cutting (i.e., trimming) patterns based on the selected ordered widths, and (5) selecting those skiving and cutting patterns that minimize the number of master rolls that are used to fill customer or standard orders.

A paper machine, for example, produces large master rolls of paper. The width of the master roll is referred to as the deckle of the master roll and is fixed (a constant) for each paper manufacturing machine. Another machine, called a winder, cuts the master roll into rolls of smaller diameter and width. The process of cutting a master roll into smaller product rolls is usually referred to as trimming. Typically, several sets of product rolls are trimmed from each master roll. The widths and diameters of each of these product rolls must match customer order requirements, and different customer orders can specify different product roll widths.

In a paper manufacturing mill, the orders allocated to a paper machine are filled by trimming the master rolls of the same width equal to the deckle of the paper machine. However, in a paper converting mill, an order can be filled by trimming master rolls of different dimensions. Also, on average, 10% of the master rolls contain defects. The trim loss when filling customer orders from defective rolls is comparatively high.

The trimming of a larger roll into smaller rolls may be stated as a problem of cutting J (known) different product (finished) rolls from a known list of master rolls I. Each order j of product rolls corresponds to an order width $w_j$, a length or diameter $l_j$, and an order quantity $r_j$ (number of rolls) supplied by the customer of order j. The quantity of the output product rolls is required to be within given tolerances specified by lower and an upper limits, $r_{jmin}$ and $r_{jmax}$, respectively. That is, $r_{jmin}$ and $r_{jmax}$ are the minimum and maximum number of product rolls that can be used to fill order j.

Each master roll of type i from the set I of master rolls corresponds to width $w_i$, diameter $l_i$, and a number of rolls ni. The parameter $\delta_i$ indicates whether an input master roll i is a defective or a good quality roll. The start and end of the defects is captured in a couple of two dimensional matrices $S\Delta_{i,k}$ and $E\Delta_{i,k}$, while $T\Delta_{i,k}$ indicates the type of the defect, where $i \in I$, and $k=1, \ldots, \delta_i$. (See the Appendix referred to hereinafter.) For convenience of understanding the invention, it can be assumed that the length/diameter li of the master rolls is equal to the length/diameter lj of the output product roll for convenience of understanding. However, this assumption is not necessary and is not necessarily true in all business scenarios.

The number of auxiliary rolls being generated by the process is designated $\check{J}$. The width $w_j$ for each auxiliary roll j should be within a given width range $w_{max}$ and $w_{min}$. The maximum (minimum) allowable overlap for joining any two of these auxiliary rolls by the skiving equipment is $\check{o}_{max}$ ($\check{o}_{min}$). It should be noted that, even if $\check{J}$ is not known a priori, it is clear from the definitions given above that $\check{J} \cap J = \phi$, where $\phi$ represents an empty set.

The cutting pattern (or winding pattern) is defined as the set of rolls (product or auxiliary) that can be trimmed from the master roll. The parameter P is used to designate all of the possible cutting patterns. The skiving pattern is defined as the set of auxiliary rolls that can be joined together to form a product roll. The parameter $\check{P}$ is used to designate all possible skiving patterns. Hence, by definition, $\check{P} \cap P = \phi$, where $\phi$ again represents an empty set.

The width (i.e., the sum of the widths of product and auxiliary rolls) of each cutting pattern p for a given type of master roll is constrained to be within a given width range $w_i$ to $w_i^{min}$. For each type of master roll, there is a subset of cutting patterns $P_i$ that will be suitable for only that particular type of master roll. The maximum number of product and auxiliary rolls in each cutting pattern should not exceed a given number $\eta_{max}$ (i.e., the number of output rolls). Similarly, the maximum number of auxiliary rolls in each skiving pattern for any given product roll should not exceed $\check{\eta}_{max}$.

The first step of the trimming/skiving optimization is to select those of the ordered widths that are suitable for skiving. All of the ordered widths for a given order set J will not be candidates for skiving. The ordered width $w_j$, where $j \in J$, is selected as a candidate width for skiving only if it satisfies the following constraints:

$$2(w_{min}) - \check{o}_{min} \leq w_j \forall (j \in J) \tag{1}$$

$$w_j \leq (w_{max})(\check{\eta}_{max}) - (\check{\eta}_{max} - 1)(\check{o}_{min}) \forall (j \in J) \tag{2}$$

$$wi_i - \left(\left\lfloor \frac{wi_i}{w_j} \right\rfloor\right)(w_j) \geq \left(\frac{\Delta}{100}\right)(wi_i) \ \forall \ (j \in J), \forall \ i \tag{3}$$

where $\lfloor \ \rfloor$ is the round down operator and $\Delta$ (specified by the customer) is the allowed trim loss percentage if the order is trimming alone. The set of the widths found by this step as candidate for skiving is designated by $\vec{J}$.

Constraint (1) specifies that the selected order widths are not less than twice a predetermined minimum order width minus an overlap required for skiving. Constraint (2) specifies that the selected order widths are not greater than a first product minus a second product, where the first product results from multiplying (a) a predetermined maximum order width and (b) a maximum number of auxiliary rolls that can be skived, and where the second product results from multiplying (c) an overlap required for skiving and (b) one less than the maximum number of auxiliary that can be skived. Constraint (3) specifies that an auxiliary width remaining after the master roll of type i has been trimmed is greater than a quantity resulting from applying a trim loss factor to the width of the master roll of type i.

The second step of the trimming/skiving optimization is to find all those auxiliary widths which are candidates for the final solution of the trimming and skiving optimization. An auxiliary width is the width of an auxiliary roll containing the remnant of a master roll from which one or more product rolls is trimmed. The auxiliary widths of all such auxiliary rolls are candidates for the skiving that will join selected ones of the remnant rolls according to skiving patterns in order to produce skived rolls. Such skived rolls can then be used directly to help fill customer orders. It is desirable to find all potential widths. At the same time, the set of auxiliary widths so found should be small enough to solve the overall problem in a reasonable amount of time.

Three strategies can be used to generate the widths for the auxiliary roll. The first strategy is given by the two following equation and constraints:

$$aw = wi_i - \left(\left\lfloor \frac{wi_i}{w_j} \right\rfloor\right)(w_j) \ \forall \ (j \in J), \forall \ i \tag{4}$$

$$w_{min} \leq aw \leq w_{max} \tag{5}$$

where aw indicates the candidate auxiliary width. The rounding down operation in equation (4) determines the number of product rolls that can be trimmed from a master roll. For example, if the width $wi_i$ for a master roll of type i is 100 and the ordered width $w_j$ is 60, then one product roll can be trimmed directly from the master roll and aw=40. However, if the width $wi_i$ for a master roll of type i is 100 and the ordered width $w_j$ is 40, then two product rolls can be trimmed directly from the master roll and aw=20.

It should be noted that zero trim loss is assumed in order to find the auxiliary widths according to the first strategy. However, this assumption is not necessary, and equation (4) can be adjusted to account for those instances in which trim loss is present. Due importance should be given to the positions of the defects and to the defect types of the master rolls when selecting the master widths.

The set of auxiliary widths that is found as a result of implementation of the first strategy is designated $\check{J}_a$. The auxiliary widths so determined are some of the widths to be skived in order to obtain the ordered widths in set $\vec{J}$.

Constraint (5) limits aw to maximum and minimum values.

The remaining auxiliary widths required to complete the ordered widths in set $\vec{J}$ are obtained using the second strategy as given by the following equation and constraint:

$$aw = \frac{w_{\vec{j}} - w_{\vec{j}a} + (k)(\check{o}_{min})}{k} \quad \forall \left(\vec{j} \in \vec{J}\right), \forall \left(\check{j}_a \in \check{J}_a\right) \quad (6)$$

$$w_{min} \leq aw \leq w_{max} \quad (7)$$

In equation (6), $k=1, 2, \ldots, (\check{\eta}_{max}-1)$. It should be noted that, if no auxiliary width is found as a result of implementing the second strategy for a given auxiliary width $w_{ja}$, $\check{j}_a \in \check{J}_a$, then $w_{ja}$ is removed from the set $\check{J}_a$. All widths obtained from the second strategy are added to the set $\check{J}_a$.

The third strategy is used to then enrich the auxiliary width set according to the following equation and constraint:

$$aw = \frac{w_{\vec{j}} + (k-1)(\check{o}_{min})}{k} \quad \forall \left(\vec{j} \in \vec{J}\right) \quad (8)$$

$$w_{min} \leq aw \leq w_{max} \quad (9)$$

In equation (8), $k=2, \ldots, (\check{\eta}_{max})$.

The above three strategies help to obtain the final set $\check{J}_a$. If there are duplicate auxiliary widths in the set $\check{J}_a$, the duplicates are removed. Also, if the difference between any two auxiliary widths is less than $\check{o}_{max} - \check{o}_{min}$, then the maximum of these two widths will be retained and the other will be removed from the auxiliary width set $\check{J}_a$. The final auxiliary width set so obtained is designated as $\check{J}$.

The three strategies explained above to generate the auxiliary rolls are disclosed herein to facilitate an understanding of the process of finding the auxiliary rolls. There are alternative and/or additional constraint logic techniques that are potentially different and that can instead be used to obtain auxiliary rolls.

The third step of the trimming and skiving optimization is to generate the skiving patterns. The process of generating the skiving patterns should be carried out separately for each suitable order width $w_{\vec{j}}$ from the set $\vec{J}$. All auxiliary widths found as a result of the second step are considered in generating the skiving patterns. The skiving patterns are generated in accordance with the following constraints:

$$\sum_{j=1}^{J} s_{\check{p},\check{j}} \leq \check{\eta}_{max} \quad \forall \left(\check{p} \in \check{P}\right) \quad (10)$$

-continued $$\sum_{j=1}^{J} s_{\check{p},\check{j}}(w_{\vec{j}} - \check{o}_{max}) \leq (w_{\vec{j}} - \check{o}_{max}) \quad \forall \left(\check{p} \in \check{P}\right) \quad (11)$$

$$\sum_{j=1}^{J} s_{\check{p},\check{j}}(w_{\vec{j}} - \check{o}_{min}) \geq (w_{\vec{j}} - \check{o}_{min}) \quad \forall \left(\check{p} \in \check{P}\right) \quad (12)$$

where $s_{\check{p},\check{j}} \in Z^+$ designates the skiving patterns.

Constraint (10) limits the number of auxiliary rolls to be skived at once, and the upper and lower limits on skiving pattern width are given by Constraints (11) and (12), respectively. All the skiving patterns obtained in this step are members of the set $\check{P}$.

The fourth step of the trimming and skiving optimization is to generate trimming patterns using ordered widths. Each cutting pattern must satisfy the following constraints:

$$\sum_{j=1}^{\check{j} \cup J} c_{p,j} \leq \eta_{max} \quad \forall (p \in P_i) \quad (13)$$

$$\sum_{j=1}^{\check{j} \cup J} (c_{p,j})(w_j + \beta) - \beta \leq wp_p \quad \forall (p \in P_i) \quad (14)$$

$$wi_i^{min} \leq wp_p \leq wi_i \forall i, \forall (p \in P_i) \quad (15)$$

where $c_{p,j} \in Z^+$ designates the cutting patterns, $wp_p$ designates the width of the pattern p, and $\beta$ designates blade consumption. Blade consumption is further described on the Appendix. Constraints (14) and (15) are linear inequalities that restrict the widths of the cutting patterns to be applied to the master roll to be within the limits $wi_i$ to $wi_{min}$. Constraint (13) is a linear inequality that is due to limitations on the trimming or cutting equipment.

There are mainly two types of defects, major (product) defects and minor (knife) defects. Minor defects represent good product except in the case where a knife (while processing) applied to the area containing the minor defect causes a major defect. However, minor defects can be part of a sale if a knife is not applied in the defective area. A set of patterns (which is a subset of the superset P) for each master roll with minor defect(s) can be generated using the constraints (13)-(15) above. Then, each pattern from this set of patterns is sequenced using $SA_{i,k}$, $EA_{i,k}$, and $TA_{i,k}$ to determine those patterns which do not include knife positions that fall into minor defect areas. Accordingly, any pattern which cannot be cut from a defective raw roll without the knife cutting into a defective area of the defective raw roll is deleted from the earlier found set of patterns for that particular defective master roll. Hence, a defective roll with minor defect(s) will add patterns less than or equal to the number of patterns found using the constraints (13)-(15) as described above.

Major defects do not belong to good product and hence cannot be part of the product roll. However, a master roll with major defect(s) can be divided into sub-rolls obtained by removing the bad or defective portions of the original raw roll using $SA_{i,k}$, $EA_{i,k}$, and $TA_{i,k}$. The patterns for each of the sub-rolls can then be generated using constraints (13)-(15).

The parameter wi (referred to as $\vec{WI}_{\vec{j}}$ in the appendix) in the constraints (13)-(15) will be equal to the width of each sub-roll.

All of these generated patterns can then be combined to obtain the final set of the patterns. This final set will be a subset of the super set P. While combining patterns, due consideration should be given to blade consumption and minimum blade separation constraints. Blade separation is considered during the logical steps of pattern generation. It should be noted that this consideration will help ensure that when a master roll with major defect(s) is utilized to fill customer orders, all the sub-rolls from that particular defective roll get used.

Co-pending U.S. patent application Ser. No. 11/287,939 filed on Nov. 28, 2005, the disclosure of which is incorporated herein by reference and is replicated in the Appendix, discloses a constraint logic programming procedure that can be adapted in accordance with the present disclosure to generate cutting as well as skiving patterns. This cutting pattern generation procedure includes routines for generating patterns for defective rolls along with that for good quality rolls. However, other procedures in accordance with the present disclosure herein can be used.

The fifth step of the trimming/skiving optimization is the selection of the cutting and skiving patterns. This selection is an Integer Linear Programming (ILP) optimization problem with the objective of minimizing the total number of master rolls that are used to meet the demand (from both the master rolls and auxiliary rolls produced by skiving) for product rolls. A matrix $sj_{\check{p},j}$ may be defined on the set $\check{P} \times J$ in such a way that $sj_{\check{p},j}$ is equal to one if the skiving pattern $\check{p}$ is for ordered width j. Hence, the objective is to perform a minimization according to the following expression:

$$\text{minimize} \sum_{i=1}^{I} \sum_{p=1}^{P} (wi_i - wp_p)(li_i)(X_p) \quad (16)$$

subject to the following constraints:

$$\sum_{i=1}^{I} \sum_{p=1}^{P} (c_{p,j})(X_p) + \sum_{\check{p}=1}^{\check{P}} (sj_{\check{p},j})(\check{X}_{\check{p}}) \geq r_{j_{min}} \quad \forall (j \in J) \quad (17)$$

$$\sum_{i=1}^{I} \sum_{p=1}^{P_i} (c_{p,j})(X_p) + \sum_{\check{p}=1}^{\check{P}} (sj_{\check{p},j})(\check{X}_{\check{p}}) \leq r_{j_{max}} \quad \forall (j \in J) \quad (18)$$

The inequalities (17) and (18) ensure that the quantity of patterns produced (from the master roll or from skiving) for each order j is within the acceptable limits $r_{jmin}$ and $r_{jmax}$. The following equation ensures that the rolls produced by skiving are totally utilized:

$$\sum_{i=1}^{I} \sum_{p=1}^{P_i} (c_{p,\check{j}})(X_{p,i}) - \sum_{\check{p}=1}^{\check{P}} (sj_{\check{p},\check{j}})(\check{X}_{\check{p}}) = 0 \quad \forall (\check{j} \in \check{J}) \quad (19)$$

The number of patterns used for a particular type of master roll should be less than the total number of master rolls available for that particular type of master roll. Hence, $$\sum_{p=1}^{P_i} X_p \leq ni_i \quad \forall i \quad (20)$$

In expressions (16)-(20), $X_p$, $p \in P_i$, and $\check{X}_{\check{p}}$, $\check{p} \in \check{P}$ are positive integer variables indicating the number of times that the corresponding (cutting and skiving, respectively) patterns are used in the final solution.

If sufficient master rolls are not available to fill an order set, the above formulation might not result in a solution. However, by relaxing constraint (17), the feasible optimal solution can be obtained, with some orders being only partially filled. Alternatively, constraint (20) can be applied only to defective master rolls. In other words, it is assumed that there is no upper limit on the number of good quality rolls. This information can be used during the stage of planning the number of master rolls to be manufactured. This approach can also help the roll converting industries to plan for the procurement of master rolls to be converted to product rolls in order to minimize overall trim loss and low master roll inventory.

Accordingly, constraint programming techniques are used to select the ordered widths as candidates for skiving and to generate the auxiliary width set. The constraint logic programming described herein finds all feasible cutting and skiving patterns. The integer linear programming formulation for pattern selection can be solved using branch and bound techniques. The skiving feature can be easily incorporated in commercially available trim solutions programs.

FIG. 1 illustrates a trimming and skiving optimization system 100 that produces trimming and skiving patterns 102 in the manner discussed above. The trimming and skiving optimization system 100 includes a database 104 that stores details 106 and 108. The details 106 relate to the machines that perform the trimming and skiving, and the details 108 relate to order details corresponding to the customer orders.

The details 106, for example, may include the maximum (minimum) allowable overlap $\check{o}_{max}$ ($\check{o}_{min}$) implemented by the relevant skiving equipment that joins auxiliary rolls. The details 106 may also include the types i of master rolls, the width $wi_i$, diameter $li_i$, and number of master rolls $ni$ for each type of master roll, the parameter $\delta_i$, the two dimensional matrices $S\Delta_{i,k}$ and $E\Delta_{i,k}$, then type $T\Delta_{i,k}$ of the defect, the width β of the roll consumed by each knife of the trimming processing equipment, the lower and upper limits on the separation between blades of the trimming processing equipment, and/or the maximum number of knives used by the trimming processing equipment as disclosed in the Appendix.

The details 108, for example, may include the order width $w_j$ and the order quantity $r_j$ (number of rolls) supplied by the customer of order j, the diameter l of the output product rolls, the allowed trim loss percentage Δ, etc.

Once the appropriate data is stored in the database 104, a processor 110 executes the trimming and skiving optimization program 200 in order to produce the optimized trimming and skiving patterns 102. The optimized trimming and skiving program 200, for example, may be defined by the equations given above and may be implemented in accordance with the flow chart shown in FIG. 2. The trimming patterns are used to cut the master rolls and, as necessary, the skived rolls. The skiving patterns are used to skive the auxiliary rolls.

Figure 2:
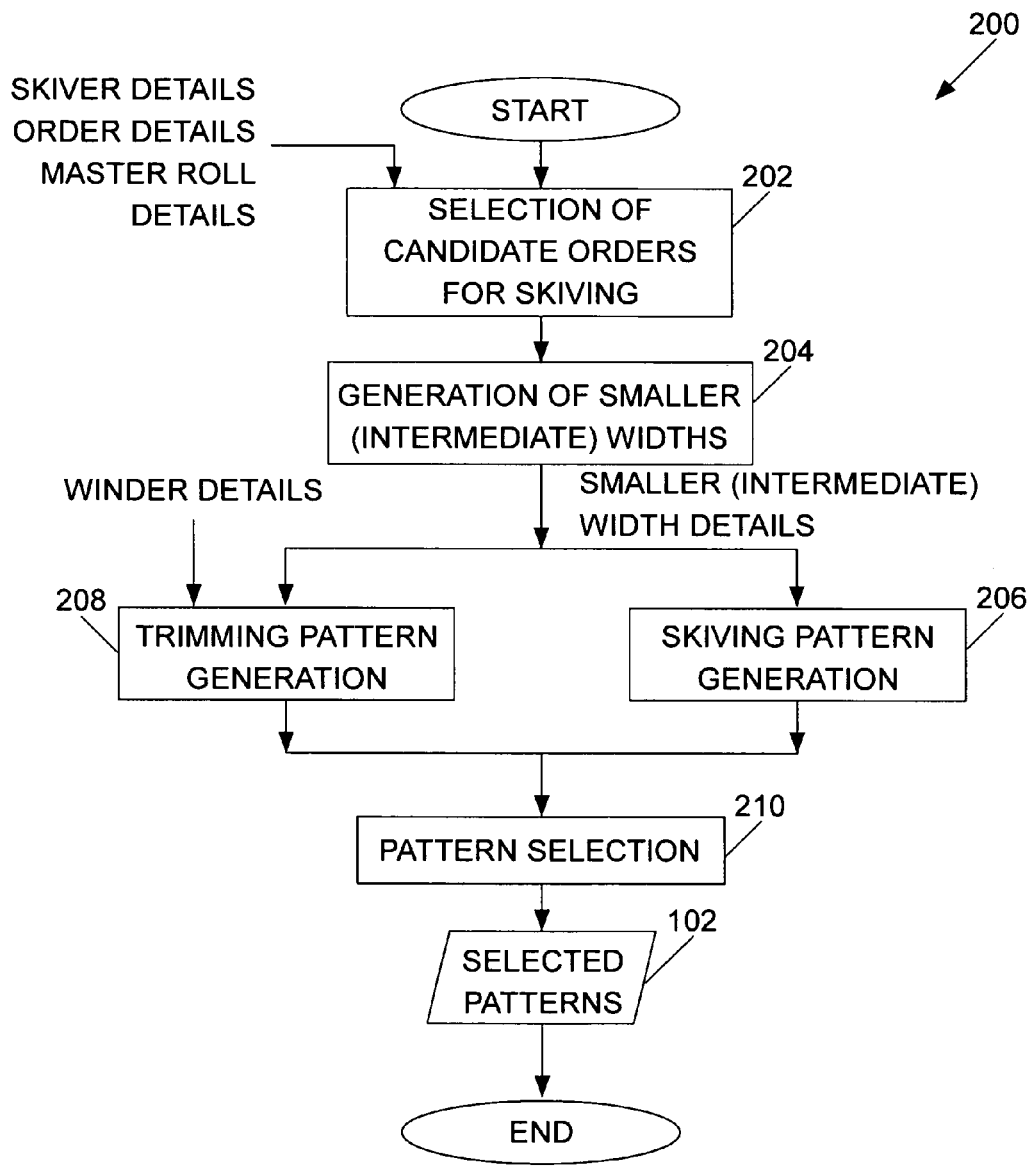
FIG. 2 illustrates a flow chart of an embodiment of an optimization program that can be executed by the trimming and skiving optimization system of FIG. 1.

As shown in FIG. 2, when the optimized trimming and skiving program 200 is started, candidate ordered widths are selected for skiving at a block 202 based on the skiver and order details stored in the database 104. In order to select these ordered widths, the block 202 may operate in accordance with constraints (1)-(3) to produce a set of candidate ordered widths designated as $\vec{J}$.

Also, the ordered widths in the set $\vec{J}$ are then processed at a block 204 in order to select therefrom auxiliary widths aw for the auxiliary rolls that are to be produced by skiving.

In order to select these auxiliary widths, the block 204 may operate in accordance with example constraints (4)-(9) to produce an auxiliary width set designated as J̆.

Skiving patterns are generated at a block 206 based on the auxiliary widths in the set J̆. In order to generate the skiving patterns, the block 206 may operate in accordance with constraints (10)-(12) to produce skiving patterns p̆ that are combined into the skiving pattern set P̆.

In addition, cutting (trimming) patterns are generated at a block 208 based on the trimming (winder) machine details stored in the database 104 and based on those ordered widths that form the union between the customer ordered widths for all orders J and auxiliary widths in the set J̆. In order to generate the cutting patterns, the block 208 may operate in accordance with constraints (13)-(15) to produce cutting p that are combined into the cutting patters set P.

As shown in FIG. 2, the generation of skiving and cutting patterns may be implemented in either order or in parallel.

At this point, all possible skiving and cutting patterns that meet the various constraints have been generated. The trimming and skiving optimization program 200 at a block 210 then determines those combinations of skiving and cutting patterns that minimize the number of master rolls that are to be trimmed to meet the customer orders J by minimizing the function given by expression (16) in accordance with constraints (17) and (18). In addition, the constraint (19) may be implemented at the block 210 in order to ensure that all of the skived rolls are totally used to fill the customer order.

Accordingly, the trimming and skiving optimization program 200 minimizes waste by selecting an optimized combination of trimming and skiving in order to fill customer orders.

Certain modifications of the present invention have been discussed above. Other modifications of the present invention will occur to those practicing in the art of the present invention. For example, as described above, the trimming and skiving optimization program is decomposed into five steps. However, a different number of steps for trimming and skiving optimization can be used.

Moreover, although the invention as described above is particularly useful to accommodate the paper manufacturing industry, the invention is also applicable to other flat sheet industries such as the dry film and plastic industries.

Furthermore, as suggested above, the constraints provided herein are by way of example only. Alternative and/or additional constraints could be used.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

Appendix

Although the invention is described below with particular reference to the charting of raw rolls of flat sheet stock to produce product rolls, it should be understood that the present invention also pertains to the charting of raw sheets of flat sheet stock to produce product sheets and further also pertains to the charting of a mix of raw rolls and sheets of flat sheet stock to produce product rolls and/or sheets.

The present invention is directed to the minimization of waste (trim loss) and/or maximization of stock utilization during charting. Waste minimization and effective utilization of stock can be realized by use of an optimization model that solves the charting problem involving a large number of customer orders (of varying width, diameter/length, quantity, and/or product type). One objective of this optimization model problem, for example, may be to maximize charting efficiency while filling customer orders from a known group of raw rolls of flat sheet stock. An additional or alternative objective of this optimization model is to maximize stock utilization.

One or more operational requirements and constraints may be considered in determining an optimized charting. A first such operational requirement might be to fill a customer order from raw rolls of the same style/grade. However, alternate style/grade rolls could be used to fill a customer order in order to improve yield and/or to meet the ordered quantity of a "must fill" customer order. It is desirable to use alternate style/grade rolls only when the charting efficiency would otherwise be not within the acceptable limits of the user.

A second operational requirement might be to completely fill all "must fill" firm customer orders and to fill other firm customer orders and/or standard orders only to improve trim yield. Standard orders are orders of frequently ordered sizes but are not firm customer orders. It is desirable to fill other firm customer orders on priority over standard orders.

A third operational requirement might be to allow the use of, or the addition to, stock for standard orders if it helps to improve charting efficiency. However, it is desirable that stock levels for standard orders not go below safe limits and not exceed peak limits set by the user. Thus, there are two types of stock, stock of raw rolls and stock of product rolls and sheets. The stock of product rolls and sheets have standard sizes and can be directly added to pertinent customer orders without any processing.

A fourth operational requirement might be to consider the width of the raw roll consumed by each knife, the lower and upper limits on blade separation, and also the maximum number of knives used by secondary processing equipment. Consumption of the width of a raw roll due to the knife and minimum blade separation and maximum number of knives might be considered when determining the cutting patterns for raw rolls.

A fifth operational requirement might be to use all raw rolls that are about to expire or that are marked as "must use" irrespective of yield. Thus, the optimization model could balance the preference to maximize yield against the preference to use older raw rolls.

A sixth operational requirement might be to consider the position of defects while using a roll having major and/or minor defects during the charting. The optimization model can be arranged to maximize the available width of a defective roll while at the same time avoiding applying a trimming or cutting knife in the areas of minor defects.

A seventh operational requirement might be to avoid the use of the same charting pattern when cutting two orders for rolls of different outside diameters (and thus different lengths) so as to avoid lengthwise wastage.

An eighth operational requirement might be to avoid putting a partial raw roll back into stock. If used, it is desirable to use the full length of a raw roll.

A ninth operational requirement might be to add any extra length, which is left on a raw roll after cutting the nominal length for all charting patterns assigned for that particular raw roll, among all the selected patterns so long as the extra length does not exceed the allowed length tolerances.

A tenth operational requirement might be to cut more than one pattern from a single raw roll. However, an upper limit can be enforced on the total number of distinct patterns that can be cut from a raw roll. If this upper limit is set to one, not more than one distinct pattern is allowed for a raw roll, though the same pattern can be repeated for that raw roll. This process is referred to as "one deep charting." If this upper limit is more than one, different patterns can be cut from a raw roll. This process is referred to as "two deep charting." If these different patterns belong to different outer diameter (different length) orders, the process will be called as two deep mixed length charting. The charting model should provide the user the flexibility to select the cutting strategy.

An eleventh operational requirement might be to put any excess width (loss) left on one raw roll towards the edges of the raw roll. For example, if 8" from the actual width remains on a raw roll, 4" should go to either side of center of the good product rolls unless moving the product rolls to the center of the raw roll makes a knife position fall into a minor defect. Accordingly, this requirement means that a product roll is cut from the center of a raw roll if the product roll to be cut is less wide than the raw roll, assuming that there are no minor defects in the raw roll.

A twelfth operational requirement might be to join two or more raw rolls of the same width to produce a longer product roll (this process is called splicing). The optimization model can be arranged to consider splicing while charting.

Apart from the above operational requirements, various other additional operational requirements and/or constraints might be considered dependent on the secondary processing equipment used in the particular flat sheet industry (e.g., minimum back stand load on sheeter, number of stacks in sheeter, edge trim, etc.). The optimization model can be arranged to consider these operational requirements and/or constraints as well.

In formulating the optimization problem, the filling of J customer orders from a known group of raw rolls I can be considered. The styles for the raw rolls and for the customer orders are assumed to be the same. However, this assumption is made for convenience only, and the styles for the raw rolls and for the customer orders need not be the same. Each customer order j specifies a width $W_j$, a nominal length $L_j$ (or diameter $D_j$), and a quantity $Q_j$. The quantity produced for customer order j is required to be within given tolerances specified by a lower quantity limit $Q_{jmin}$ and an upper quantity limit $Q_{jmax}$. It should be noted that, if an order is an optional order, the minimum order quantity $Q_{jmin}$ for that particular order can be set equal to zero. The length for each product roll (the roll(s) to be delivered to the customer) for order j should be within a given tolerance on the nominal length specified as within $L_{jmax}$ and $L_{jmin}$.

Each raw roll i, from the set I of raw rolls, corresponds to a width $WI_i$, a length $LI_i$, a quantity $QI_i$, and a number of days to live $\lambda I_i$. The parameter $\delta_i$ indicates whether a raw roll i is a defective roll or is a good quality roll. The start and end of the defects in a defective raw roll i are captured in a couple of two dimensional matrices, $SA_{i,k}$ and $EA_{i,k}$, while $TA_{i,k}$ indicates the type of the defect, where $i \in I$, and $k=1, \ldots, \delta_i$. The parameter $\delta_i$ is equal to the number of defects in input roll i.

The cutting pattern is defined as a set of product rolls (i.e., ordered rolls) to be charted out of one or more input parent rolls. The parameter P represents all possible cutting patterns for all customer orders under consideration. The width of each cutting pattern p should, of course, be less than the width of the raw roll. The number of product rolls in each cutting pattern should not exceed a given number $\eta_{max}$.

Each raw roll is characterized by width, length, and number of defects. All of the good quality raw rolls (raw rolls with zero defects) can be grouped into a few distinct groups. The grouping of good raw rolls is mainly based on width and length of the raw rolls. Thus, the good raw rolls having different widths and/or lengths will belong to different groups. It should be noted that the tolerance given on the nominal length of the orders allow raw rolls with nearly the same lengths to be put into the same group. However, if the variation in length is high for two good raw rolls having the same width, these two raw rolls belong to different groups.

It may be assumed, as an example, that all raw rolls are grouped into $\vec{I}$ number of distinct groups. Here, $N_{\vec{i}}$ for each group $\vec{i}$ represents the total number of raw rolls in that group. Another parameter $NE_{\vec{i}}$ is derived from $\lambda I_i$ and is used to indicate the number of raw rolls in a group $\vec{i}$ which are about to expire or are marked as "must-use" raw rolls. However, it should be noted that each defective raw roll will form a distinct group due to the unique positions of the defects in individual ones of the defective rolls.

The problem of charting customer orders onto raw rolls, as a single optimization problem, is extremely complex to solve due to the combinatorial NPhard nature of the charting problem itself and to the dimensionality that must be considered. A combined formulation for the generation and selection of patterns to fill customer orders is unwieldy to solve due to model granularity. In order to arrive at a solution in polynomial time, the charting problem can be roughly divided into three sub-problems, (1) pattern generation according to the customer orders, (2) matching of the generated patterns to for distinct raw roll groups, and (3) selection and association of patterns to raw rolls to fill the demand for customer orders.

Constraint logic programming (CLP), for example, may be applied to solve the first sub-problem. As is known, constraint logic programming involves assigning a finite set of values for each pertinent variable where the values satisfy a finite set of constraints. Linear programming (LP), for example, may be applied to solve the third sub-problem. Linear programming involves constraints and desired results that are linearly related. Linear programming has been applied to find solutions to problems with linear constraints. A further type of known linear programming is mixed integer linear programming (or MILP) and is similar to linear programming problem. However, mixed integer linear programming includes at least one constraint that is not continuous but must have an integer value.

This decomposition of the problem as set out above results in a global optimal solution as all the feasible patterns will be generated in the first step of the decomposed solution.

Pattern Generation for Good Raw Roll Groups

Assuming that two orders of differing outside diameters (and thus different lengths) cannot be cut from the same raw roll, different diameter orders are considered separately for pattern generation. Therefore, all feasible cutting patterns are generated a priori using order widths belonging to the same diameter. Each cutting pattern can be required, if desired, to satisfy the following constraints:

$$\sum_{j=1}^{J} (PO_{p,j})(W_j + \beta) - \beta = WP_p \, \forall \, (p \in P_{\vec{i}}) \quad (1)$$

$$\overrightarrow{WI}_{\vec{i}} \geq WP_p \geq \overrightarrow{WI}_{\vec{i}_{min}} \, \forall \, (\vec{i} \in \vec{I}), \, \forall \, (p \in P_{\vec{i}}) \quad (2)$$

$$\sum_{j=1}^{J} PO_{p,j} \leq \eta_{max} \, \forall \, (p \in P_{\vec{i}}) \quad (3)$$

where $PO_{p,j} \in Z^+$ indicates the cutting patterns, $\beta$ represents the blade consumption, and $\overrightarrow{WI}_{\vec{i}}$ is the width of the raw rolls in group $\vec{i}$. Constraint (2) restricts the width $WP_p$ of the cutting patterns for the raw roll group $\vec{i}$ to be within the limits $\vec{WI_{\vec{i}}}$ and $\vec{WI_{\vec{i}\ min}}$. Constraint (3) imposes a practical limit on the number of cutting patterns.

The length (or diameter) $LP_p$ for each pattern is equal to the nominal length (or diameter) of the orders selected to generate that particular pattern. It should be noted that the patterns found for a group of raw rolls $\vec{i}$ would form a sub-set of the patterns $P_{\vec{i}}$. Hence, the super set of the patterns P includes all the sub-sets of patterns found for all groups of raw rolls. The relationship between a pattern p and a raw roll group $\vec{i}$ is indicated by parameter, $PI_{p,\vec{i}}$, which is equal to one if the pattern p is for raw roll group $\vec{i}$. The centering of the patterns (requirement number 11 above) can also be handled during pattern generation. The parameter $PI_{p,\vec{i}}$ is logically used to map the suitable pattern and the raw rolls.

Pattern Generation for Defective Raw Roll

As mentioned above, the pattern generation for defective raw rolls has to be carried out separately because of the unique positions of the defects on the defective rolls.

Raw Rolls with Minor Defect(s)

Minor defects represent good product except in the case where a knife (while processing) applied to the area containing the minor defect causes a major defect. However, minor defects can be part of a sale if a knife is not applied in the defective area. A set of patterns $PO_{p,j}^*$ (which is a subset of the superset P) for each raw roll with minor defect(s) can be generated using the constraints (1)-(3) above. Then, each pattern from this set of patterns is sequenced using $SA_{i,k}$, $EA_{i,k}$, and $TA_{i,k}$ to determine those patterns which do not include knife positions that fall into minor defect areas. Accordingly, any pattern which cannot be cut from a defective raw roll without the knife cutting into a defective area of the defective raw roll is deleted from the set of patterns $PO_{p,j}^*$. Hence, a defective roll with minor defect(s) will result in patterns less than or equal to the number of patterns found using the explicit enumeration procedure given by constraints (1)-(3). The patterns $PO_{p,j}^*$ are added to the patterns $PO_{p,j}$ found for the good rolls.

Raw Rolls with Major Defect(s)

Major defects do not belong to good product and hence cannot be part of the product roll. However, a raw roll with major defect(s) can be divided into sub-rolls obtained by removing the bad or defective portions of the original raw roll using $SA_{i,k}$, $EA_{i,k}$, and $TA_{i,k}$. The patterns for each of the sub-rolls can then be generated using constraints (1)-(3). The parameter $\vec{WI_{\vec{i}}}$ in the constraints (1)-(3) will be equal to the width of each sub-roll.

All of these generated patterns can then be combined with $PO_{p,j}$ to obtain the final set of the patterns. While combining patterns, due consideration should be given to blade consumption and minimum blade separation constraints. Blade separation is considered during the logical steps of pattern generation. It should be noted that this consideration will help ensure that when a raw roll with major defect(s) is utilized to fill customer orders, all the sub-rolls from that particular defective roll get used.

The pattern generation for defective raw rolls with both types of defects is simply a combination of the separate procedures explained above for each type of defect.

Association of Patterns to Raw Rolls (Matching)

Once the patterns are generated, the patterns are matched to the raw rolls including good raw rolls, raw rolls with minor defects, and sub-rolls produced from raw rolls having major defects. This matching simply associates the charting patterns determined during pattern generation as described above with the available stock on the basis of the various attributes such as width, length, quality, and quantity. This matching, for example, can be implemented by the use of suitable rules or otherwise.

Optimal Selection of Matching Patterns to Raw Rolls

During optimal pattern selection, it should be remembered that all firm orders considered for charting should get filled completely. Optional orders and stock are used just to improve trim efficiency. When it is decided to use a particular raw roll, the roll should by used up completely. An integer decision variable $y_{\vec{i}}$ may be used to indicate the used number of raw rolls from the group $\vec{i}$.

There are at least two ways of charting a raw roll, namely two deep charting (including two deep mixed length charting) and one deep charting. As mentioned before, the parameter $PI_{p,\vec{i}}$ indicates the pattern and raw roll group suitability. If a pattern p is suitable for a raw roll group $\vec{i}$, an integer decision variable $n_{p,\vec{i}}$ gives the number of times the pattern p is used in raw roll group $\vec{i}$.

Constraints

As given by the following inequality, the summation of the length of all the patterns used for raw roll group $\vec{i}$ should be less than the length of the used raw rolls in raw roll group $\vec{i}$:

$$\sum_{p=1}^{P_{\vec{i}}} (LP_p)(1 - ULP_p)(n_{p,\vec{i}}) \le (\vec{LI}_{\vec{i}})(y_{\vec{i}}) \forall \vec{i} \quad (4)$$

where $LP_p$ is the length of pattern p. The term $ULP_p$ is the under length tolerance allowed for pattern p and is the minimum of the under length tolerances $(L_j - L_{j\ min})/L_j$ that are allowed for the orders which are present in pattern p. The length of raw roll group, $\vec{LI}_{\vec{i}}$, is the average length of all the raw rolls which belong to raw roll group $\vec{i}$.

Equation (4) ensures that, if no raw roll is used from raw roll group $\vec{i}$, then no pattern will be filled from that particular raw roll group. It should be noted that Equation (4) applies to one deep charting, to two deep charting, and to two deep mixed length charting. However, some amount of post processing is needed while actually mapping patterns to used number of raw rolls from the raw roll group $\vec{i}$.

Similarly, $$\sum_{p=1}^{P_{\vec{i}}} (LP_p)(1 + OLP_p)(n_{p,\vec{i}}) \leq (\overrightarrow{LI_{\vec{i}}})(y_{\vec{i}}) \forall \vec{i} \quad (5)$$

The term $OLP_p$ is the over length tolerance allowed for the pattern p. This term is the minimum of the over length tolerances $(L_{jmax}-L_j)/L_j$ that are allowed for the orders which are present in the pattern p.

The total number of raw rolls that are used should not be greater than the total available raw rolls for that particular raw roll group $\vec{i}$. That is, $$y_{\vec{i}} \leq N_{\vec{i}} \forall \vec{i} \quad (6)$$

The following constraint is included to ensure that all of the used raw rolls are used completely:

$$\sum_{p=1}^{P_{\vec{i}}} n_{p,\vec{i}} = (y_{\vec{i}}) \sum_{p=1}^{P_{\vec{i}}} \left\lfloor \frac{\overrightarrow{LI_{\vec{i}}}}{(LP_p)(1 - ULP_p)} \right\rfloor \forall \vec{i} \quad (7)$$

where $\lfloor . \rfloor$ is the round down operator. The maximum number of patterns for each used raw roll should not be greater than the maximum allowed patterns MAXP as given by the following:

$$\sum_{p=1}^{P_{\vec{i}}} n_{p,\vec{i}} \leq (MAXP)(y_{\vec{i}}) \forall \vec{i} \quad (8)$$

The customer provides an upper limit MI on the number of raw rolls to be cut. Therefore, the summation of all the used raw rolls should be less than the customer given number MI as given by the following:

$$\sum_{\vec{i}=1}^{\vec{I}} y_{\vec{i}} \leq MI \quad (9)$$

The demand for all must-make-orders should be filled either by using the raw rolls or by using the available stock (if any). Thus, $$\sum_{\vec{i}=1}^{\vec{I}} \sum_{p=1}^{P_{\vec{i}}} (PO_{p,j})(n_{p,\vec{i}}) + s_j \geq Q_{jmin} \forall j \quad (10)$$

where $s_j$ is a free integer variable to indicate the number of raw rolls used from stock for order j (if order j is a standard order). A positive value of $s_j$ indicates use from stock, while a negative value represents add to stock. However, the number of extra rolls produced for an order j (firm or optional) should be less than the maximum allowed as given by the following:

$$\sum_{\vec{i}=1}^{\vec{I}} \sum_{p=1}^{P_{\vec{i}}} (PO_{p,j})(n_{p,\vec{i}}) + s_j \leq Q_{jmax} \forall j \quad (11)$$

If the order is optional, then $Q_{jmin}$ for that order is set equal to zero, and $Q_{jmax}$ is set equal to the optional order quantity. The stock level should be within a safe limit $SS_j$ and a peak limit $PS_j$ for each standard order j. Therefore, $$SS_j \leq CS_j - s_j \leq PS_j \forall j \quad (12)$$

where $CS_j$ is the current stock for order j. The customer has the flexibility to set the values for safe and peak stock limits for different standard orders as per the current business needs. It should be noted that there might be additions to stock for one order and use from stock for another order to increase the yield. The number of raw rolls which are going to expire in the near future (i.e., $\lambda I_t \leq ADL$, where ADL is the customer specified limit on allowed days before expiration) for group $\vec{i}$ is known from parameter $NE_{\vec{i}}$.

The following constraint gives the number of the ageing raw rolls in group $\vec{i}$ which are not used:

$$na_{\vec{i}} \geq NE_{\vec{i}} - y_{\vec{i}} \forall \vec{i} \quad (13)$$

It should be noted that, if the number of used raw rolls in a particular raw roll group is greater than the number of ageing rolls for that particular group, then the decision variable $na_{\vec{i}}$ has a value of zero.

The grouping of raw rolls helps to reduce the number of integer variables, and thereby improves the performance of the optimization model. This grouping also helps to use raw rolls of increasing age, which is an added advantage.

Objective Function

The objective of the optimization model is to minimize loss due to charting and due to ageing according to the following objective function:

$$LOSS = \sum_{\vec{i}=1}^{\vec{I}} \sum_{p=1}^{P_{\vec{i}}} (\overrightarrow{WI_{\vec{i}}} - WP_p)(LP_p)(n_{p,\vec{i}}) + \sum_{\vec{i}=1}^{\vec{I}} (\overrightarrow{WI_{\vec{i}}})(\overrightarrow{LI_{\vec{i}}})(na_{\vec{i}}) + \sum_{\vec{i}=1}^{\vec{I}} y_{\vec{i}} \quad (14)$$

where $\overrightarrow{WI_{\vec{i}}}$ is the width of a raw roll in group $\vec{i}$, $WP_p$ is the width of the cutting patterns for the raw roll group $\vec{i}$ within the limits $\overrightarrow{WI_{\vec{i}}}$ and $\overrightarrow{WI_{\vec{i}\,min}}$, $LP_p$ is the length of the cutting patterns for the raw roll group $\vec{i}$, $\overrightarrow{LI_{\vec{i}}}$ is the average length of all the raw rolls which belong to raw roll group $\vec{i}$, $y_{\vec{i}}$ is an integer decision variable used to indicate the used number of raw rolls from the group $\vec{i}$, $n_{p,\vec{i}}$ is the number of patterns p to be applied to raw roll group $\vec{i}$, and $na_{\vec{i}}$ is the number of the ageing raw rolls in group $\vec{i}$. The second term in the objective function is to accommodate the loss due to non-usage of those raw rolls (defective or good) which are going to expire in near future (e.g., 0-2 days). The last term in the objective function is included to select that solution which uses less raw rolls if there is more than one solution that gives the same trim loss.

This objective function minimizes loss (e.g., minimizes the unused portions of raw rolls following charting) and maximizes the utilization of available stock of product and raw rolls (e.g., by ensuring that raw rolls including minor and major defects are use to the extent possible). However, it should be understood that the present invention could be arranged to minimize loss without maximizing stock utilization or to maximize stock utilization without minimizing loss.

Figure 3:
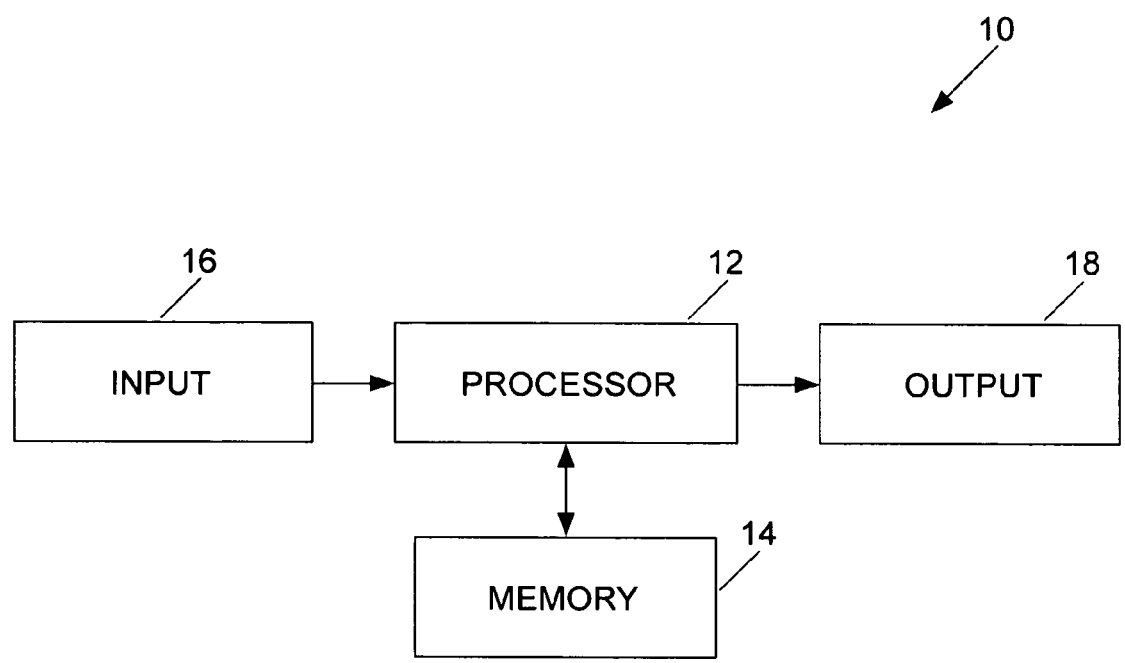
FIG. 3 illustrates an order charting system disclosed in Appendix A.

The above optimization model can be implemented in connection with an order charting system 10 shown in FIG. 3. The order charting system 10 includes a processor 12, a memory 14, an input device(s) 16, and an output device(s) 18.

Figure 4:
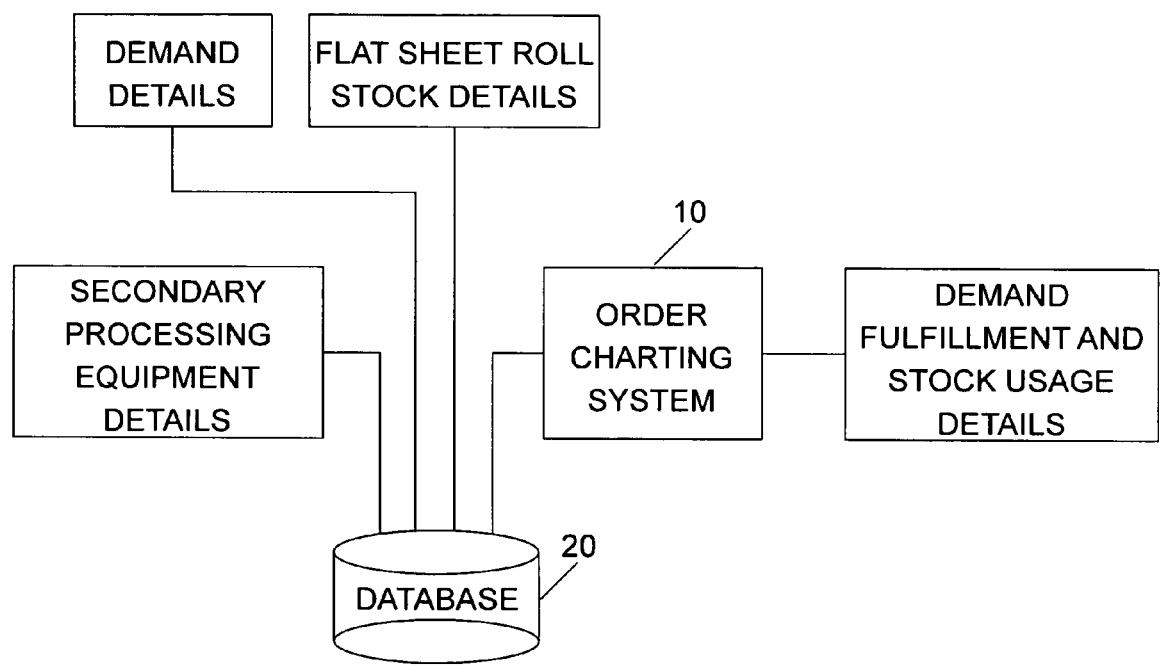
FIG. 4 illustrates additional details of the of the order charting system of FIG. 3; and, FIG. 5 is a flow chart of an embodiment of an optimization program that can be executed by the order charting system of FIGS. 3 and 4.

As shown in FIG. 4, the memory 14 includes a database 20 that is used to store various information entered by the input device 16 or otherwise. For example, the database 20 stores the customer order related data referred to in FIG. 4 as demand details. This customer order information for each order j can include, for example, the width $W_j$, length $L_j$, quantity $Q_j$, the number MI of rolls ordered by the customer, the safe limit $SS_j$, the peak limit $PS_j$, and customer specified limit ADL on the allowed days before expiration ADL.

Also, the database 20 stores flat sheet roll stock details for the raw stock that is available for charting. These details can include, for example, width, length, quality, defects, aging, and quantity data for each available raw roll group.

Moreover, the database 20 stores secondary processing equipment details for the equipment that is to be used to chart the available raw stock. These details can include, for example, the width of the raw roll consumed by each knife of the secondary processing equipment, the lower and upper limits on the separation between blades of the secondary processing equipment, and the maximum number of knives used by the secondary processing equipment.

In addition, the database 20 can store additional data such as the maximum allowed patterns MAXP and the limit $\eta_{max}$ on the number of product rolls for each cutting pattern.

All of this data is stored in the database 20 of the memory 14 for further processing.

Figure 5:
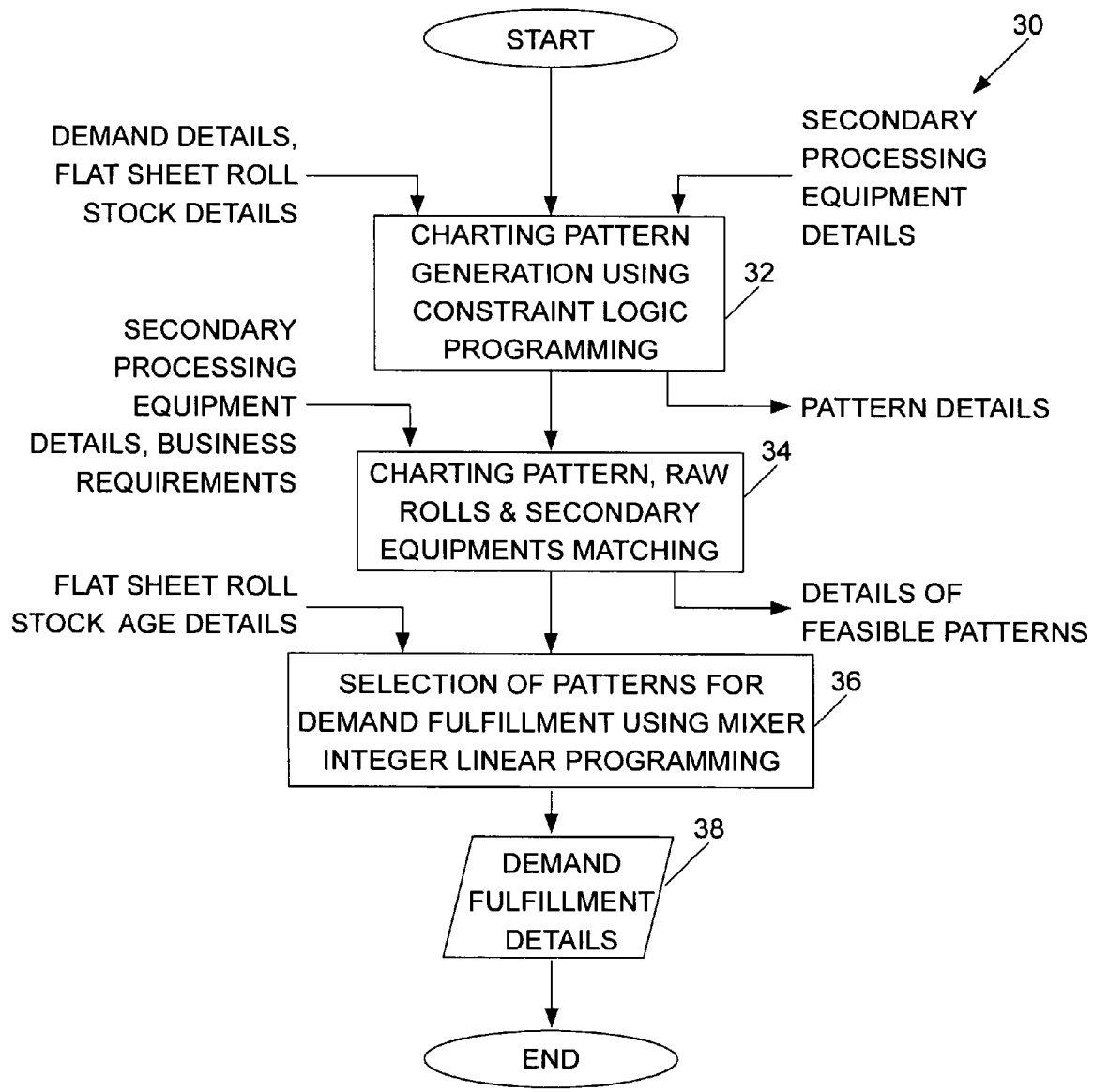

In addition, the memory 14 stores an optimization program 30 described above and shown by way of the flow chart of FIG. 5 that is executed by the order charting system 10 to optimally chart the patterns resulting from the customer orders onto the available raw rolls and, as shown in FIG. 4, to output the demand fulfilment and stock usage details that are used by the secondary processing equipment to produce the product rolls from the raw rolls according to the optimal charting patterns.

The output device 18 receives the demand fulfilment and stock usage details. The output device 18, for example, can be a display device that displays the demand fulfilment and stock usage details to a user who can then enter this information into the secondary processing equipment in order to fill the customer orders. Alternatively, the output device 18 can be a drive or other device that copies the demand fulfilment and stock usage details onto computer readable media that can then be transferred to the secondary processing equipment that is used to fill the customer orders. As a further alternative, the output device 18 can itself be the secondary processing equipment that directly receives the demand fulfilment and stock usage details and uses this information to fill customer orders from matching raw rolls as determined by the demand fulfilment and stock usage details.

When executing the optimization program 30, the processor 12 at 32 generates the charting patterns using constraint logic programming as described above. Accordingly, the processor 12 reads the demand details given by the customer orders that are being charted, the flat sheet roll stock details relating the available stock that can be used to fill the customer orders, and certain details about the secondary processing equipment details such as blade consumption.

For example, the processor 12 reads the demand details for each order j that can include the width $W_j$, length $L_j$, quantity $Q_j$, the number MI of rolls ordered by the customer, the safe limit $SS_j$, the peak limit $PS_j$, and the customer specified limit ADL on the allowed days before expiration ADL. Also, the processor 12 reads the flat sheet roll stock details for the raw stock that is available for charting. These details can include, for example, width, length, quality, defects, aging, and quantity data for each available raw roll group. Moreover, the processor 12 reads certain of the secondary processing equipment details for the equipment that is to be used to chart the available raw stock. These details can include, for example, the blade consumption $\beta$ and the limit $\eta_{max}$ for the secondary processing equipment to be used in filling the customer orders J.

Based on this read information, the processor 12 generates charting patterns according to equations (1)-(3). Thus, the raw rolls are divided into groups based on the flat sheet roll stock data. As explained above, each group contains rolls having the same width and length within certain tolerances as described above. Any raw rolls in the group that contain defects can be designated as such. Also, the two dimensional matrices, $SA_{i,k}$, $EA_{i,k}$, and $TA_{i,k}$ can be set up based on the defect information contained in the flat sheet roll stock data. Alternatively, the grouping information and defect matrices can be determined beforehand and read by the processor 12.

The cutting patterns $PO_{p,j}$ are generated based on good raw rolls (those having no defects) subject to the constraints (1)-(3) and the corresponding customer order and raw roll details as well as on certain information such as the blade consumption $\beta$ and the limit $\eta_{max}$.

In order to maximize stock utilization, charting patterns are also generated for those raw rolls having minor and major defects subject to the constraints (1)-(3). Accordingly, the raw rolls containing minor defects are sequenced using $SA_{i,k}$, $EA_{i,k}$, and $TA_{i,k}$ as described above. Any of the cutting patterns that cannot be cut from a defective raw roll without the knife cutting into a defective area of the defective raw roll are not added to the possible charting patterns. Also, raw rolls with major defect(s) are cut into sub-rolls, using $SA_{i,k}$, $EA_{i,k}$, and $TA_{i,k}$, thus removing the bad or defective portions of the original raw rolls. The resulting charting patterns for the raw rolls containing minor defects are added to the charting patterns generated for the good raw rolls. Similarly, the sub-rolls resulting from cutting out the areas from raw rolls containing major defects are charted and these charting patterns are also added to the charting patterns generated for the good raw rolls.

At 34, the charting patterns generated at 32 are matched to the available stock including raw rolls. As discussed above, this matching associates the charting patterns determined during pattern generation as described above with the available stock on the basis of the various attributes such as width, length, quality, and quantity. During matching at 34, the processor 12 uses certain of the details relating to the secondary processing equipment (such as the lower and upper limits on the separation between blades of the secondary processing equipment, and the maximum number of knives used by the secondary processing equipment) in matching the charting patterns generated at 32 to the available flat sheet stock. Thus, if a particular raw roll cannot be cut in accordance with a particular charting pattern because the pattern or the roll fall outside of the lower and upper blade separation limits for the secondary processing equipment or because the cutting will require a number of knives exceeding the maximum number of knives used by the secondary processing equipment, that pattern and that roll are not matched. The width range and/or diameter/length range for the secondary processing equipment can also be used in matching charting patterns and raw roll or sheet stock. Also for example, the minimum and maximum load (in terms of weight) that particular secondary processing equipment can handle can be considered when matching the charting patterns generated at 32 and the available stock.

At 36, the optimal matches or associations are selected based on mixed integer linear programming such as that described above. In the specific example given above, the processor 12 at 36 uses the constraints (4)-(13) and the objective function of equation (14) to select optimal ones of the matches determined at 34 between one or more charting patterns p and one or more raw roll groups $\vec{i}$.

These optimal matches are then supplied at 38 to the user, to a storage medium, or directly to the secondary processing equipment as disclosed above in order to produce the product rolls ordered by the customers. This process minimizes waste and also maximizes stock utilization.

What is claimed is:

1. A method of selecting cutting and skiving patterns to be used in the production of product rolls from at least one master roll, the product rolls having widths ordered by customers, the method implemented by a processing system, the method comprising:
   selecting those of the ordered widths that are suitable for skiving, wherein the selection of ordered widths is based on a first constraint;
   selecting auxiliary widths based on the selected ordered widths and on a width of the master roll, wherein the selecting of auxiliary widths is further based on a second constraint;
   generating skiving patterns that can be used to join the selected auxiliary widths to form the skived rolls and to form auxiliary rolls based on the auxiliary widths, wherein the generation of the skiving patterns is based on a third constraint;
   generating cutting patterns that can be used to trim the master roll to form the product rolls, wherein the generation of the cutting patterns is based on a fourth constraint; and,
   selecting those of the generated skiving and cutting patterns that optimize trim efficiency.

2. The method of claim 1 wherein the first constraint is dependent on minimum and maximum limits on the auxiliary widths.

3. The method of claim 1 wherein the first constraint is dependent on a maximum number of auxiliary widths that are to be skived.

4. The method of claim 1 wherein the first constraint is dependent on a skiving overlap.

5. The method of claim 1 wherein the second constraint is dependent on minimum and maximum limits on the auxiliary widths.

6. The method of claim 1 wherein the second constraint is dependent on a skiving overlap.

7. The method of claim 1 wherein the third constraint is dependent on a skiving overlap.

8. The method of claim 1 wherein the third constraint is dependent on a maximum number of auxiliary widths that are to be skived.

9. The method of claim 1 wherein the fourth constraint is dependent on minimum and maximum limits on the width of each cutting pattern.

10. The method of claim 1 wherein the fourth constraint is dependent on a maximum number of auxiliary widths that are to be skived.

11. The method of claim 1 wherein the selecting of those of the generated skiving and cutting patterns that optimize trim efficiency comprises imposing a fifth constraint, and wherein the fifth constraint is dependent on minimum and maximum limits on the number of product rolls produced for each customer order.

12. The method of claim 1 wherein the selecting of those of the generated skiving and cutting patterns that optimize trim efficiency comprises imposing a fifth constraint, and wherein the fifth constraint maximizes utilization of auxiliary rolls resulting from trimming of the master roll.

13. The method of claim 1 wherein the selecting of those of the generated skiving and cutting patterns that optimize trim efficiency is performed according to an integer linear programming formulation.

14. The method of claim 1 wherein the master rolls include at least one good roll and at last one defective roll.

15. A method comprising five distinct steps for selecting cutting and skiving patterns to be used in the production of product rolls having widths ordered by customers, the method implemented by a processing system, the method comprising:
   selecting those of the ordered widths as candidates for skiving;
   selecting auxiliary widths based on the selected ordered widths;
   generating skiving patterns that can be used to join the selected auxiliary widths to form skived rolls;
   generating cutting patterns that can be used to trim at least one master roll to form the product rolls; and,
   selecting those of the generated skiving and cutting patterns that minimize the number of master rolls used to produce product rolls.

16. The method of claim 15 further comprising constraining the selection of the ordered widths according to minimum and maximum limits on the auxiliary widths.

17. The method of claim 15 further comprising constraining the selection of the ordered widths according to a maximum number of auxiliary widths that are skived to produce a product roll.

18. The method of claim 15 further comprising constraining the selection of the ordered widths according to a skiving overlap.

19. The method of claim 15 further comprising constraining the selection of auxiliary widths according to minimum and maximum limits on the auxiliary widths.

20. The method of claim 15 further comprising constraining the selection of auxiliary widths a skiving overlap.

21. The method of claim 15 further comprising constraining the generation of skiving patterns according to a skiving overlap.

22. The method of claim 15 further comprising constraining the generation of skiving patterns according to a maximum number of auxiliary widths that are skived to produce a product roll.

23. The method of claim 15 further comprising constraining the generation of cutting patterns according to minimum and maximum limits on the width of each cutting pattern.

24. The method of claim 15 further comprising constraining the generation of cutting patterns according to a maximum number of auxiliary widths that are skived to produce a product roll.

25. The method of claim 15 further comprising constraining the selection of the generated skiving and cutting patterns according to minimum and maximum limits on the number of product rolls produced for each customer order.

26. The method of claim 15 wherein the selection of the generated skiving and cutting patterns comprises maximizing utilization of auxiliary rolls resulting from trimming of the master roll.

27. The method of claim 15 wherein the selection of the generated skiving and cutting patterns is performed according to an integer linear programming formulation.

28. The method of claim 15 wherein the at least one master roll includes at least one good roll and at last one defective roll.

29. A computer readable storage medium having program code stored thereon which, when executed, performs the following functions:
- constraint based generation of cutting patterns that can be used to trim a master roll in order to fill customer orders for product rolls;
- constraint based generation of skiving patterns for skiving auxiliary rolls that result from trimming the master roll in order to produce the product rolls according to the customer orders; and,
- integer linear programming selection of those of the generated skiving and cutting patterns that optimize trim efficiency for the production of the product rolls.

30. The computer readable storage medium of claim 29 wherein execution of the stored program code performs the following additional function:
- selecting ordered widths as candidates for skiving such that (i) the selected order widths are not less than twice a predetermined minimum order width minus an overlap required for skiving, (ii) the selected order widths are not greater than a first product minus a second product, wherein the first product results from multiplying (a) a predetermined maximum order width and (b) a maximum number of auxiliary rolls that can be skived, and wherein the second product results from multiplying (c) an overlap required for skiving and (b) one less than the maximum number of auxiliary that can be skived, and (iii) an auxiliary width remaining after the master roll has been trimmed is greater than a quantity resulting from applying a trim loss factor to the width of the master roll.

31. The computer readable storage medium of claim 30 wherein execution of the stored program code performs the following additional functions:
- selecting first auxiliary widths that are between maximum and minimum limits;
- selecting second auxiliary widths that result from dividing a first quantity by a variable k, wherein the first quantity is formed by subtracting the first auxiliary widths from the candidate ordered widths and by adding a product formed by multiplying the variable k and the skiving overlap, wherein the variable k varies from one to the maximum number of auxiliary rolls that can be skived;
- selecting third auxiliary widths that result from dividing a second quantity by a variable k, wherein the second quantity is formed by adding the candidate ordered widths and a product formed by multiplying (k-1) and the skiving overlap; and,
- adding the first, second, and third auxiliary widths to form a set of auxiliary rolls that can be skiving according to the skiving patterns.

32. The computer readable storage medium of claim 29 wherein the function of integer linear programming selection of the generated skiving and cutting patterns comprises selecting those generated skiving and cutting patterns that minimize trim loss.

33. The computer readable storage medium of claim 32 wherein execution of the stored program code performs the following additional function:
- selecting ordered widths as candidates for skiving such that (i) the selected order widths are not less than twice a predetermined minimum order width minus an overlap required for skiving, (ii) the selected order widths are not greater than a first product minus a second product, wherein the first product results from multiplying (a) a predetermined maximum order width and (b) a maximum number of auxiliary rolls that can be skived, and wherein the second product results from multiplying (c) an overlap required for skiving and (b) one less than the maximum number of auxiliary that can be skived, and (iii) an auxiliary width remaining after the master roll has been trimmed is greater than a quantity resulting from applying a trim loss factor to the width of the master roll.

34. The computer readable storage medium of claim 33 wherein execution of the stored program code performs the following additional function:
- selecting first auxiliary widths that are between maximum and minimum limits;
- selecting second auxiliary widths that result from dividing a first quantity by a variable k, wherein the first quantity is formed by subtracting the first auxiliary widths from the candidate ordered widths and by adding a product formed by multiplying the variable k and the skiving overlap, wherein the variable k varies from one to the maximum number of auxiliary rolls that can be skived;
- selecting third auxiliary widths that result from dividing a second quantity by a variable k, wherein the second quantity is formed by adding the candidate ordered widths and a product formed by multiplying (k-1) and the skiving overlap; and,
- adding the first, second, and third auxiliary widths to form a set of auxiliary rolls that can be skiving according to the skiving patterns.

35. The computer readable storage medium of claim 29 wherein the constraint based generation of cutting patterns function comprises constraint based generation of cutting patterns that can be used to trim at least one good master roll and at least one defective master roll in order to fill customer orders for product rolls, and wherein the constraint based generation of skiving patterns function comprises constraint based generation of skiving patterns for skiving auxiliary rolls that result from trimming the at least one good master roll and the at least one defective master roll in order to produce the product rolls according to the customer orders.

* * * * *